United States Patent
Bostick et al.

(10) Patent No.: US 9,881,232 B2
(45) Date of Patent: Jan. 30, 2018

(54) VIEWPOINTS OF A POINT OF INTEREST

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 14/879,123

(22) Filed: Oct. 9, 2015

(65) Prior Publication Data
US 2017/0103283 A1   Apr. 13, 2017

(51) Int. Cl.
   G06K 9/00   (2006.01)
   G06K 9/62   (2006.01)
   G06K 9/52   (2006.01)

(52) U.S. Cl.
   CPC ....... G06K 9/6201 (2013.01); G06K 9/00476 (2013.01); G06K 9/52 (2013.01)

(58) Field of Classification Search
   None
   See application file for complete search history.

(56) References Cited

U.S. PATENT DOCUMENTS

| 8,510,045 | B2 | 8/2013 | Rueben et al. |
| 8,688,367 | B2 | 4/2014 | Mauderer |
| 8,880,535 | B1 | 11/2014 | Agarwal et al. |
| 8,913,083 | B1 | 12/2014 | Ogale et al. |
| 2011/0184953 | A1 | 7/2011 | Joshi et al. |
| 2015/0116360 | A1 | 4/2015 | Jones et al. |

FOREIGN PATENT DOCUMENTS

| CN | 101852617 A | 3/2009 |
| WO | 2014108907 A1 | 7/2014 |
| WO | 2015108761 A1 | 7/2015 |

OTHER PUBLICATIONS

Bostick et al.; U.S. Appl. No. 15/259,384, filed Sep. 8, 2016; Entitled "Viewpoints of a Point of Interest".
List of IBM Patents or Patent Applications Treated As Related; Dated Sep. 8, 2016; 2 pages.
Appendix P: List of IBM Patents or Patent Applications Treated as Related, Dated Jan. 3, 2017, pp. 1-2.
U.S. Appl. No. 15/384,358, filed Dec. 20, 2016; Entitled "Viewpoints of a Point of Interest".
(Continued)

*Primary Examiner* — Atiba O Fitzpatrick
(74) *Attorney, Agent, or Firm* — Isaac J. Gooshaw

(57) ABSTRACT

A method, computer program product, and a computer system is provided. A processor determines a first viewpoint of the point of interest, where the first viewpoint includes a first image group captured from a first location. A processor determines a second viewpoint of the point of interest, where the second viewpoint includes a second image group captured from a second location. A processor determines a first ranking score for the first viewpoint based on the first image group. A processor determines a second ranking score for the second viewpoint based on the second image group. A processor generates a ranked list of the first viewpoint and the second viewpoint based on the first ranking score and the second ranking score.

18 Claims, 4 Drawing Sheets

(56) References Cited

OTHER PUBLICATIONS

U.S. Appl. No. 15/384,418, filed Dec. 20, 2016; Entitled "Viewpoints of a Point of Interest".

IBM; "System and method to enrich images with semantic data"; An IP.com Prior Art Database Technical Disclosure; IPCOM000156659; Published on: Jul. 30, 2007; IP.com Electronic Publication: Jul. 30, 2007; pp. 1-9. <http://null/IPCOM/000156659>.

VIEWPOINTS OF A POINT OF INTEREST

BACKGROUND OF THE INVENTION

The present invention relates generally to the field of electronic maps, and more particularly to presenting viewpoints for a point of interest.

Much like physical maps that preceded them, electronic maps typically present a geographical representation of an area. Along with the contours and features of the surrounding land, electronic maps typically include landmarks or other points of interest that users of the map may wish to see pictures of or visit. Electronic maps also include detail regarding the location of such points of interest, such as geographical coordinates, that were cumbersome to find in physical maps.

SUMMARY

Embodiments of the present invention provide a method, system, and program product to present viewpoints of a point of interest. A processor determines a first viewpoint of the point of interest, where the first viewpoint includes a first image group captured from a first location. A processor determines a second viewpoint of the point of interest, where the second viewpoint includes a second image group captured from a second location. A processor determines a first ranking score for the first viewpoint based on the first image group. A processor determines a second ranking score for the second viewpoint based on the second image group. A processor generates a ranked list of the first viewpoint and the second viewpoint based on the first ranking score and the second ranking score.

DETAILED DESCRIPTION

Figure 1:
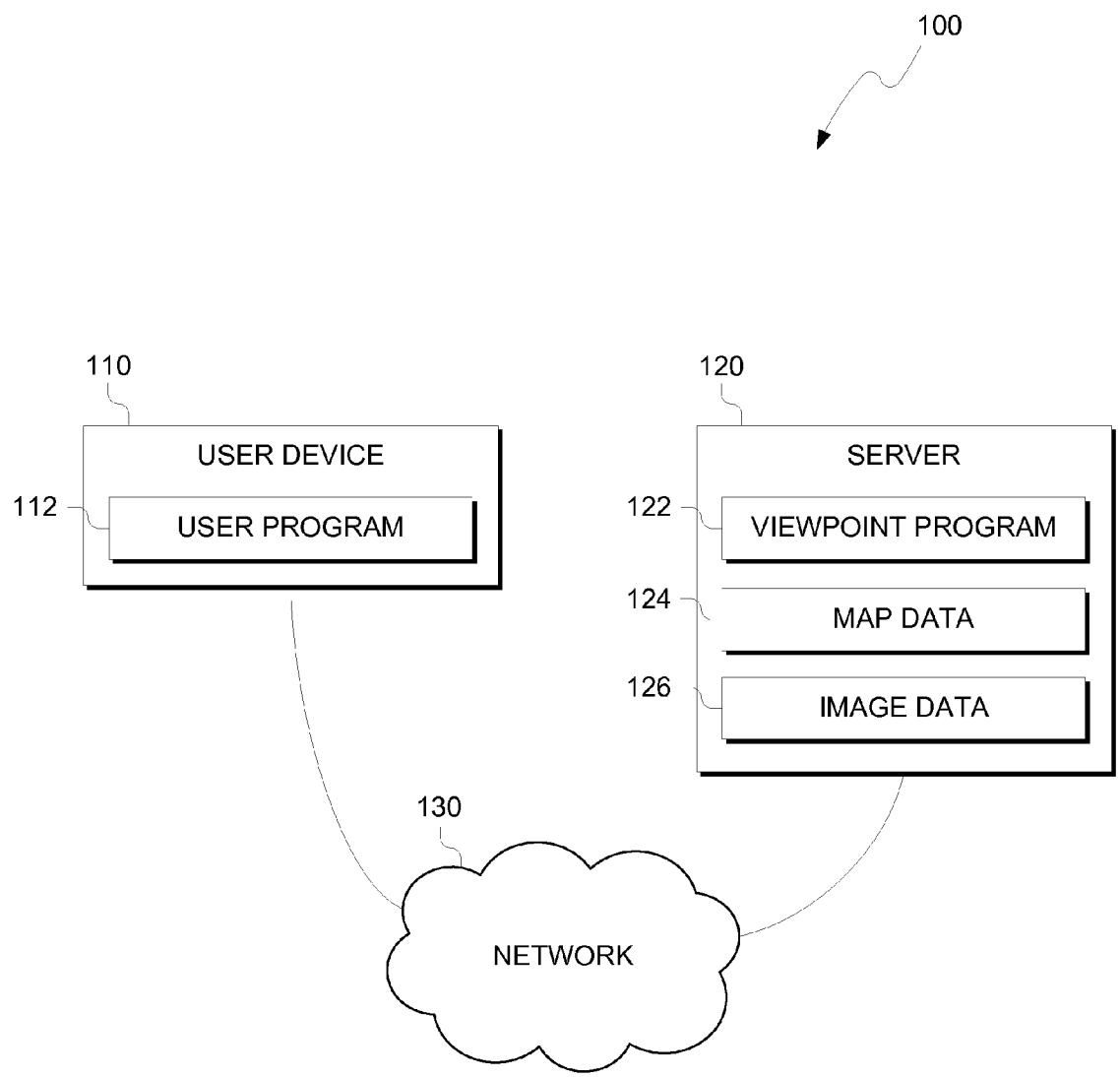
FIG. 1 is a functional block diagram illustrating a networked environment, in accordance with an exemplary embodiment of the present invention.

While solutions to presenting points of interests (POIs) on a map are known, they do not take into account the viewing of the point of interest. Some landmarks are large in size or scope and require a drastically different location to view the landmark than the actual location of the landmark. Other viewpoints of POIs may also provide a better perspective of the landmark. Embodiments of the present invention recognize that by analyzing previously captured images of a POI, popular viewpoints of the POI can be determined and suggested to users who visit the POI. Furthermore, images of more popular viewpoints of a POI can be provided to users searching for the POI. Embodiments of the present invention also recognize that by analyzing metadata regarding the collected images additional indicators can be identified to provide popular viewpoints of a POI.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110 and server 120 connected over network 130. User device 110 includes user program 112. Server 120 includes viewpoint program 122, map data 124 and image data 126.

In various embodiments of the present invention, user device 110 and server 120 are each a computing device that can be a standalone device, a server, a laptop computer, a tablet computer, a netbook computer, a personal computer (PC), or a desktop computer. In another embodiment, user device 110 or server 120 represents a computing system utilizing clustered computers and components to act as a single pool of seamless resources. In general, user device 110 and server 120 can each be any computing device or a combination of devices with access to map data 124 and image data 126 and is capable of executing user program 112 and viewpoint program 122. User device 110 and server 120 may each include internal and external hardware components, as depicted and described in further detail with respect to FIG. 3.

In this exemplary embodiment, user program 112 is stored on user device 110. Viewpoint program 122, map data 124 and image data 126 are stored on server 120. However, in other embodiments, user program 112, viewpoint program 122, map data 124 and image data 126 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between user device 110 and server 120, in accordance with a desired embodiment of the present invention.

In various embodiments, user program 112 of user device 110 communicates with viewpoint program 122 to provide a user with viewpoints for a given POI. In some embodiments, a POI is a landmark, such as a building or natural formation. In other embodiments, a POI can be any object or location indicated on a map. In various embodiments, server 120 includes map data 124. Map data 124 includes electronic map data with the location of various points of interests (POIs) and other features within an area. User program 112 receives input from a user indicating a POI. User program 112 sends the requested POI to viewpoint program 122. Viewpoint program 122 searches map data 124 for the POI to find the POI's location.

In various embodiments, viewpoint program 122 gathers various images and information regarding the images that are available from various sources. For example, viewpoint program 122 gathers images from online picture repositories, social networks, social media networks, and any other service or platform where images can be posted. In some scenarios, viewpoint program 122 includes known POIs that are of interest to users. For example, viewpoint program 122 includes a list of names or identifiers indicating known POIs (e.g., "Statue of Liberty" or "Rock of Gibraltar"). Viewpoint program 122 searches various sources for images of the known POIs, storing the images in image data 126. As another example, viewpoint program 122 retrieves images based on queries previously received from users. For example, if a search query is popular and frequently made by users, then viewpoint program 122 includes the search query as a POI. In other scenarios, viewpoint program 122 retrieves images for POI indicated in map data 124 without being searched for by a user. In such a scenario, viewpoint program 122 retrieves images and determines if the image captures a POI. Based on the location and direction the image is taken, viewpoint program 122 compares location metadata of an image to electronic map data to determine if the image is taken from a place that includes the POI in the captured image.

In some embodiments, viewpoint program 122 stores retrieved images of POIs in image data 126. In some scenarios, image data 126 includes links to or locations of the retrieved images. In various embodiments, image data 126 may also include metadata about the images gathered. In one scenario, location data of an image is extracted and stored in image data 126. For example, when captured by a digital camera, an image is stored in a exchangeable image file format (EXIF) including metadata with a latitudinal and longitudinal coordinate of the device when the image was captured. Viewpoint program 122 extracts the location metadata from the image to determine the location the image was taken. In another scenario, feedback data is gathered for images in image data 126. For example, feedback data includes comments made by other users regarding the image. As another example, feedback data includes ratings, an amount of likes, or other community-based approval metrics associated with an image. In some embodiments, if image data 126 does not include image data 126 associated with a POI, then viewpoint program 122 gathers images from other sources based on the requested POI. In some scenarios, server 120 includes any picture repositories, social networks, social media networks, and any other service or platform where images can be posted and, as such, viewpoint program gathers images for POIs from server 120.

In various embodiments, viewpoint program 122 groups images in image data 126 based on the viewpoint of a POI. For example, viewpoint program 122 identifies that twenty images of a POI are stored in image data 126. Based on location data indicated as metadata of the images, ten images from the north of the POI, six images are from the east, and four images are from the west. Viewpoint program 122 creates three groups to represent the locations where images of a POI where captured from, or viewpoints of the POI. In various embodiments, viewpoint program 122 groups viewpoints based on location images of a POI where captured from. In some scenarios, viewpoint program 122 groups images for a given viewpoint in a radius around a given location. For example, viewpoint program 122 groups images into a viewpoint ten meters wide and located twenty meters south from the POI. In another scenario, viewpoint program 122 analyzes the distribution of locations for images of the POI and determines locations based on the distributions of images and their corresponding locations. For example, a large group of images where captured in an area that stretches over thirty square meter area that is one hundred meters to the northwest of a POI. Another smaller group covers only a five square meter area that is six meters from the POI. Even though the larger group covers a larger area and due to the group's higher density, viewpoint program 122 groups images from that location into a viewpoint. One of ordinary skill in the art will appreciate that any method or process of grouping images into viewpoint groupings may be used without deviating from the invention. In some embodiments, viewpoint groupings may vary in size, location, and density. In other embodiments, viewpoint groupings may have a fixed size, location, or density.

In some scenarios, a retrieved image may not have location metadata when captured. Users may remove metadata from an image when posted to an online repository or the image may not have location data when captured (e.g., a scan of a printed image). In such scenarios, viewpoint program 122 performs image analysis to the retrieved image to determine the location that the image was captured. For example, viewpoint program 122 compares the image to images in each viewpoint grouping. Viewpoint program 122 performs a content-based image retrieval (CBIR) search between the image and each set of images for viewpoint groupings. When the content of the image matches the content of images in a viewpoint grouping, viewpoint program 122 determines the location of the image without metadata to be the location of the matching viewpoint grouping. In one scenario, the image may be similar to more than one viewpoint. In such scenarios, viewpoint program 122 selects the viewpoint with the closest similarity measure. For example, viewpoint program 122 determines a image distance for each comparison between the image without metadata and images in a viewpoint. An exact match (e.g., the same picture compared to itself) has an image distance of zero (e.g., each pixel in the image is the same). As the perspective changes between the images, the images distance increases. Viewpoint program 122 determines an average image distance between the image without metadata and images taken from the viewpoint. Viewpoint program 122 selects the viewpoint grouping with the lowest average image distance. Therefore, the image without metadata is assigned a location to a viewpoint that closely matches the view and perspective of the POI that is similar to other images known to be taken at the viewpoint.

In various embodiments, viewpoint program 122 determines a ranking score for images for each viewpoint. In one embodiment, viewpoint program 122 determines a ranking score based on the frequency or number of images captured within a viewpoint. For example, one hundred images of a POI are in image data 126. One group has sixty images from a first viewpoint, thirty images from a second viewpoint, and ten from a third viewpoint. Viewpoint program 122 determines a frequency ranking score of 0.6 (60/100) for the first group, 0.3 for the second and 0.1 for the third.

In another embodiment, viewpoint program 122 determines a ranking score for a viewpoint based on the visibility of the POI from images taken from the viewpoint. Some viewpoints may have obstructions in the way of or blocking the viewing of the POI. Viewpoint program 122 performs object recognition to determine the position of a POI in an image. For example, image data 126 includes an unobstructed view of the POI. Viewpoint program 122 determines if any other objects of features of the surround area (e.g., a hill) obstruct the view of the POI from the associated viewpoint. Viewpoint program 122 determines a visibility score of the POI for an image based on percentage of the POI is unobscured from view covers (e.g., an obstruction covers twenty-five percent of the POI, therefore the visibility score is 0.75=1−0.25). In some scenarios, viewpoint program 122 averages the visibility score for all images in a given viewpoint. In other scenarios, viewpoint program 122 selects the lowest or highest visibility score for a group of images associated with a viewpoint.

In an embodiment, viewpoint program 122 determines a ranking score for a viewpoint based on the feedback related to images associated with the viewpoint. Image data 126 includes metadata relating to user supplied feedback. For example, feedback data includes comments left from other users regarding an image. As another example, feedback data includes a rating or other metric indicating the popularity, or unpopularity, of an image among other users. In one scenario, viewpoint program 122 determines a feedback score for images in a viewpoint group based on the an average of a rating metric for images in the group. Furthermore, viewpoint program 122 may normalize the ratings to compare and weight the feedback score among the different viewpoint groups. For example, image data 126 includes images shared on a social network. The social network gathers feedback related to the images in the form of likes, or a single option to show appreciation or approval of the image. Viewpoint program 122 determines the average number of likes images in a viewpoint have received. POI determines a higher feedback score for viewpoints with higher averages of likes than those with lower averages. Furthermore, viewpoint program 122 may normalize the averages among all viewpoint groups to compare and combine ranking scores, as discussed herein. For example, one group averages 75 likes and another averages 25. The normalized feedback ranking score for the first group would be 0.75 or 75/(75+25).

In another scenario, viewpoint program 122 determines a feedback score based on the sentiment of comments associated with images in a viewpoint group. Viewpoint program 122 analyzes comments of an image with natural language processing to determine the sentiment of the comments. Some comments may express positive sentiment. Positive sentiment includes terms such as "beautiful", "great", "excellent", or other descriptive terms indicating appreciation of the image. Other comment may express negative sentiment. Negative sentiment includes terms such as "boring", "ugly", "awful" or other descriptive terms indicating disapproval of the image. Viewpoint program 122 collates the comments with positive and negative sentiment to determine a feedback score for an image. For example, the feedback score for an image is proportion of positive comments versus negative comments (e.g., 20 negative comments and 80 positive comments results in a feedback score of 0.80, or 80/(80+20), for the image). In various embodiments, viewpoint program 122 averages the feedback score for each group to determine an overall feedback score for the group (i.e., a viewpoint feedback score). Viewpoints with a higher feedback score include images of the POI that are more popular or visually appealing to users than viewpoints with lower feedback score (e.g., more negative comments).

In some embodiments, viewpoint program 122 combines more than one of the frequency score, visibility score or the feedback score to determine a ranking score for the viewpoint groups. In some scenarios, viewpoint program 122 adds the frequency, visibility and feedback scores together. In other embodiments, viewpoint program 122 assigns a weight to each score type and then adds the results together (i.e., a weighted average of the frequency, visibility and feedback scores). The weights could be change to reflect the preferences of a user searching for POIs via user program 112. For example, more weight could be applied to the feedback score if a user wishes to have a viewpoint popular among the community or communities' feedback data was gather from. As another example, more weight could be applied to the visibility score to find a clearer view of the POI. One of ordinary skill will appreciate that the ranking score can be determined by any one of the frequency score, the visibility score, the feedback score, or combination thereof without deviating from the invention.

In various embodiments, viewpoint program 122 determines a ranking score for the viewpoint groups of a POI. Based on the ranking score, viewpoint program 122 sends information to user program 112 to display the viewpoints and the corresponding locations on an electronic map. Viewpoint program 122 also sends the ranking score to user program 112. User program 112 displays an indication corresponding to the ranking score for the displayed viewpoints. For example, user program 112 displays a numerical representation of the ranking score. As another example, user program 112 displays a visual representation of the ranking score (e.g., a viewpoint with a higher-ranking score is displayed in a different color than a viewpoint with a lower score). In some embodiments, viewpoint program 122 or user program 112 filter one or more viewpoints based on the ranking score. For example, if the ranking score is below a threshold, the either viewpoint program 122 or user program 112, removes the viewpoint from being sent or displayed, respectively.

In some embodiments, viewpoint program 122 determines common composition factors found in images associated with a viewpoint. If a composition factor is frequent or common among the images in a group, then viewpoint program 122 provides an indication of the composition factor to user program 112 when sending the information regarding the viewpoint when a POI is selected. For example, viewpoint program 122 analyzes a timestamp stored in the metadata of the images in a group. In one scenario, if enough images in the group are taken at similar times, then viewpoint program 122 provides the time as a common composition factor of the images taken from the viewpoint (e.g., if over 50% of the images in a group are taken around 6:00 PM, then viewpoint program 122 provides the common composition factor of images taken in the late afternoon or early evening). Example composition factors include, but are not limited to, a time of day, weather conditions, framing, orientation, included objects (for example, foreground and background objects), or an arrangement of subjects to be captured in an image. Additionally, composition factors may include any visual effect or alteration to an image such as vignetting, color (e.g., hues, brightness or saturation), lighting arrangements, and the like that can be applied pre or post process to the image. In some embodiments, viewpoint program 122 is configured to access one or more photo-editing programs to remove one or more visual effects or alterations from an image. In some such embodiments, viewpoint program 122 presents the image without the visual effects or alterations to the user, thereby allowing the user to view an image that is more closely related to what is likely visible to the user as opposed to what is shown in the modified image.

In various embodiments, user program 112 receives input from the user to select one of the viewpoints currently displayed. In response, user program 112 requests from viewpoint program 122 images associated with the selected viewpoint. In scenarios where the images are stored in image data 126, viewpoint program 122 sends the images captured from the viewpoint to user program 112 for display to the user. In scenarios where the images are stored on different computing devices, viewpoint program 122 sends a link or location of the image to user program 112. As such, user program 112 retrieves the image based from the device or program associated with the received link or location. A user may select the various viewpoints and, in response, user program 112 retrieves and displays images captured from a location with the originally received POI within view captured by the image.

Figure 2:
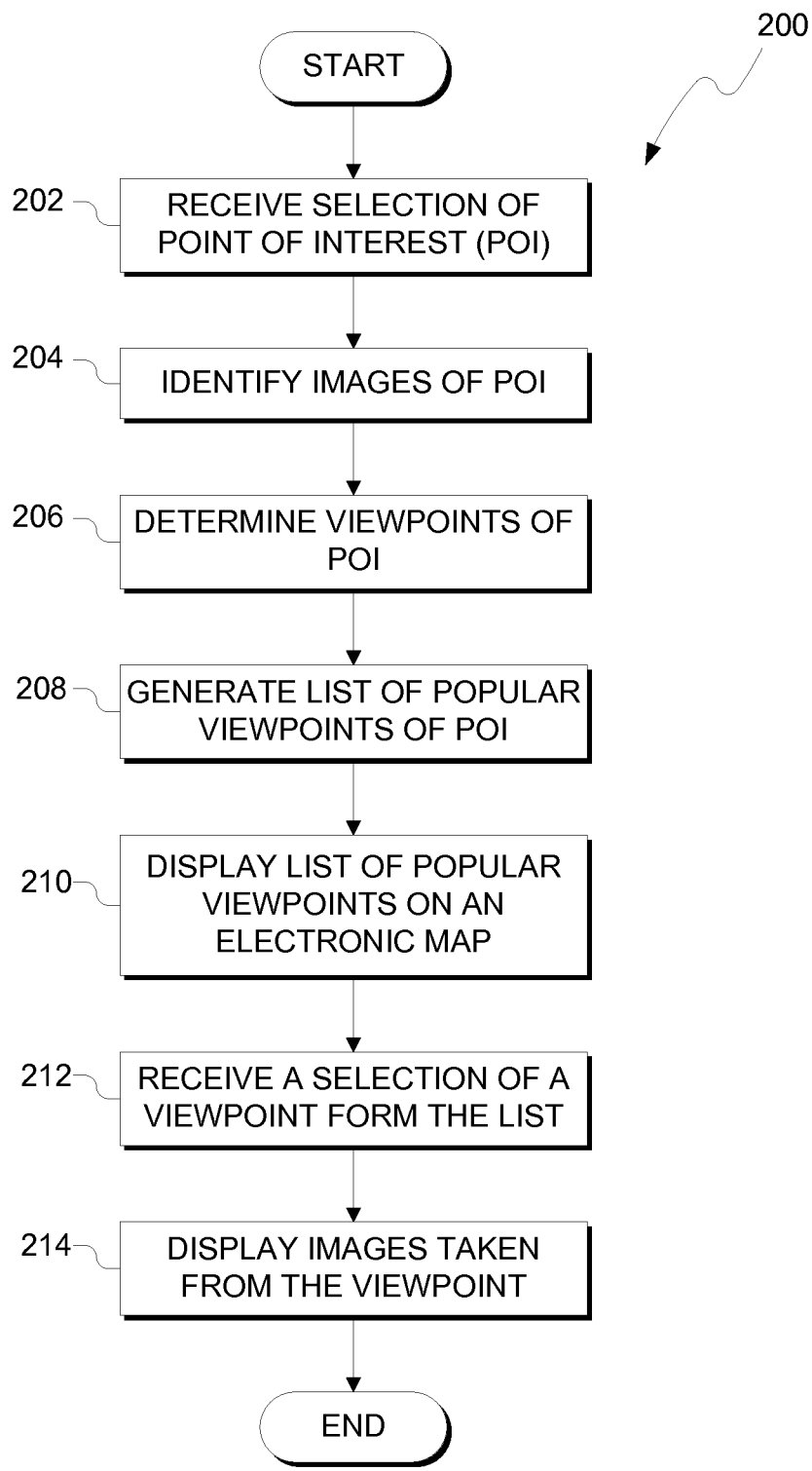
FIG. 2 illustrates operational processes of viewpoint program, on a computing device within the environment of FIG. 1, in accordance with an exemplary embodiment of the present invention.

FIG. 2 illustrates operational processes, generally designated 200, of viewpoint program 122. In process 202, viewpoint program 122 receives a selection of a POI from user program 112. In some embodiments, user program 112 receives a search query or name for a POI. Viewpoint program 122 searches map data 124 for the POI and returns the map data 124 of the surrounding area of the POI to user program 112 for display to the user. In other embodiments, user program 112 displays an electronic map to the user.

User program receives map data 124 from viewpoint program 122 for display. User program 112 provides the user with interface elements to navigate the electronic map. Additionally, viewpoint program 122 sends POIs to user program 112 for display on the user. If a user selects a POI, then user program 112 sends the selection to viewpoint program 122.

In process 204, viewpoint program 122 identifies images capturing the POI. In some embodiments, image data 126 includes images of the POI. Viewpoint program 122 identifies the images in image data 126 associated with the POI. In other embodiments, viewpoint program 122 retrieves images of the POI for other sources (not shown). In one scenario, a source of images, such as an online picture repository, has a search interface. Viewpoint program 122 searches the repository for images of the POI, retrieving the images and any metadata associated with the images. In another scenario, viewpoint program 122 retrieves images from a source, extracting location metadata from retrieved images. Based on a location and direction the image was captured from, viewpoint program 122 compares the image' metadata to map data 124. If the image was captured in a location and direction from where the POI may be viewed from, then viewpoint program 122 identifies the image as containing the POI. For example, viewpoint program 122 identifies a viewing distance and viewing angle for an image. Based on the viewing distance and angle, viewpoint generates a viewing area in the shape of the cone. Viewpoint program 122 projects the cone onto an electronic map, based on the location and direction the image was captured at. If the viewing area overlaps with a POI, then viewpoint program 122 identifies the image as capturing the POI.

In another scenario, image data 126 includes images designated as capturing a POI. For example, an administrator of viewpoint program 122 provides images of various landmarks or other POIs (i.e., known POI images). When viewpoint program 122 retrieves an image from a source, viewpoint program 122 compares the image to known POI images. Based on the comparison, when the retrieved image matches a known POI image, viewpoint program 122 identifies the image as capturing the POI as indicated in the known POI image. In another scenario, viewpoint program 122 performs a CBIR search by comparing the image to image groupings taken from various viewpoints of the POI. When the image is similar to images from a viewpoint, viewpoint program 122 assigns the location of the viewpoint to the image.

In process 206, viewpoint program 122 determines viewpoints represented by the images of the POI. Viewpoint program 122 groups images from similar locations and perspectives into a viewpoint. In some scenarios, viewpoint program 122 may select fixed sized areas for a viewpoint. In other scenarios, viewpoint program 122 may vary a viewpoints size based desired size, location, or density. In process 208, viewpoint program 122 determines a ranking score for the groups of images associated with each viewpoint. Viewpoint program 122 determines a ranking for a viewpoint score based on the proportion of images from the viewpoint, the visibility of the POI from the viewpoint, feedback associated with images from the viewpoint, or any combination thereof. A higher-ranking score indicates a viewpoint where captured images are frequently taken, have clear views of the POI, or are popular among users or other individuals. In some embodiments, viewpoint program 122 determines a ranking score for a viewpoint based on common composition factors of images taken from the viewpoint. Viewpoint program 122 includes known popular composition factors, such as images taken at a "golden hour" (e.g., the time surrounding a sunrise or sunset). If a certain amount of images taken from a viewpoint include popular composition factors (e.g., over two-thirds of images are taken at sunset at a viewpoint), then viewpoint program 122 increases the ranking score for the viewpoint.

In process 210, viewpoint program 122 sends a command to user program 112 to display an electronic map along with the viewpoints. The command includes the locations of the viewpoints and the associated ranking scores for the viewpoints. User program 112 displays the viewpoints for the selected POI. User program 112 may also display the ranking score. In some embodiments, user program 112 displays a numerical representation of the ranking score. In other embodiments, user program 112 displays a graphical representation of the ranking score. In one embodiment, user program 112 may not be display viewpoints if a ranking score is below a threshold (e.g., the viewpoint is not popular).

In process 212, viewpoint program 122 receives a selection of a viewpoint. User program 112 receives input from a user regarding a selection of a viewpoint displayed on the electronic map. User program 112 sends an indication of the selected viewpoint to viewpoint program 122. In process 214, viewpoint program 122 sends one or more images taken from the viewpoint that captured the POI. In some embodiments, viewpoint program 122 sends images stored in image data 126 taken from the viewpoint of the POI. In other embodiments, viewpoint program 122 sends links or locations of the image to user program 112. In response, user program 112 retrieves images from the received links or locations.

In another scenario, user program 112 displays an electronic map for a user to explore. User program 112 retrieves map data 124 from viewpoint program 122 including POIs and their respective viewpoints. User program 112 displays POIs and their respective viewpoints on the displays electronic map. As the user navigates the electronic map, user program 112 displays indications of the POIs and their respective viewpoints. Furthermore, user program 112 may display viewpoints with a ranking score above a certain threshold. As such, a user can view an area to see popular viewpoints for multiple POIs in the displayed area of the electronic map. For example, a user who has plans to visit a particular city would be provided an electronic map with various POIs and popular viewpoints for viewing the POIs. In some embodiments, user program 112 is configured to generate an itinerary for the user, based on selected viewpoints for POIs presented in the electronic map. The user is provided with a list of viewpoints for POIs in a given area. For example, user program 112 receives a selection of one or more POIs from a user. In this example, viewpoint program 122 identifies viewpoints with a high-ranking score for the selected POIs (e.g., popular viewpoints associated with the selected viewpoints). Additionally, viewpoint program 122 determines popular times to view the associated POI with each viewpoint. Viewpoint program 122 generates an itinerary for the user to provide a list of viewpoints for the selected POIs and popular times to view the POI, such that the user is able to visit each respective viewpoint at a time that is substantially similar to a popular time associated with each viewpoint. In some embodiments, viewpoint program 112 is configured to generate an itinerary for the user, based on the selected viewpoints for POIs, popular times to view a POI from a selected viewpoint, and travel considerations associated with viewing the POIs. For example, user program 112 can take into account the distance between the viewpoints, types of paths for commute to the viewpoints, duration of commute to each viewpoint, and times of accessibility for a given viewpoint (e.g., for locations of viewpoints that are closed or not accessible during certain time periods). In some embodiments, user program 112 is configured to access such information from an on-line source via network 130. In some embodiments, user program 112 utilizes the functions of a global positioning system (GPS)/mapping program to determine, at least in part, such information. In some embodiments, the functions of one or more photo-editing programs and GPS/mapping programs are included, at least in part, as part of user program 112 such that user program 112 is configured to function as described herein. Such functioning is known and understood by one skilled in the art and a further, more detailed, description of such functioning is not required.

Figure 3:
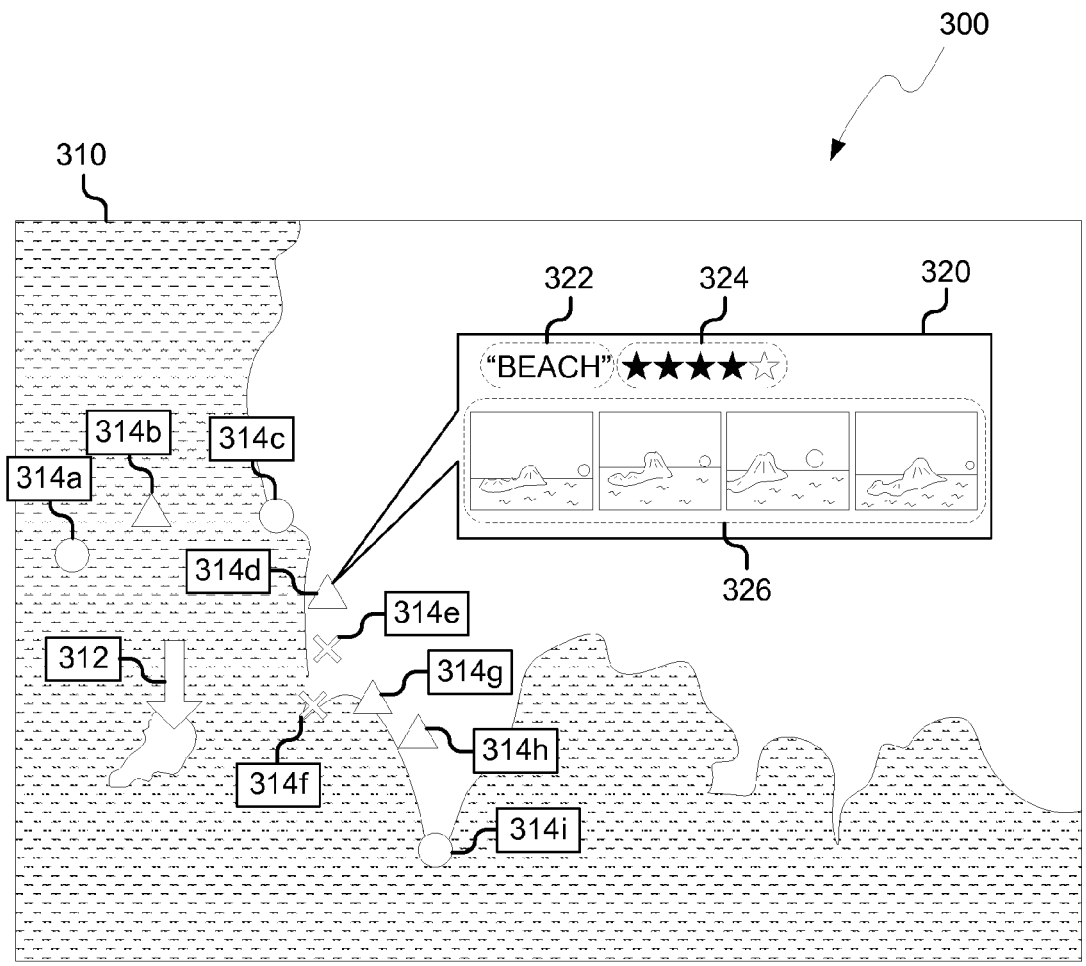
FIG. 3 depicts an example visualization of a user interface provided by a user program.

FIG. 3 depicts an example visualization of user interface 300 provided by a user program 112. User interface 300 includes a display of electronic map 310. Viewpoint program 122 sends map data 124 to user program 112 for display. User program 112 receives input from the user to navigate within electronic map 310, such as to pan and zoom to different areas represented by map data 124. User program 112 also receives input from a user regarding selected POI 312. In some embodiments, user program 112 receives a selection from a user regarding a location for a POI on electronic map 310. For example, a user with a pointing device, such as a mouse, selects a location for a POI as displayed on electronic map 310. In another embodiment, user program 112 provides a search component to search for locations or POIs in map data 124.

Upon receiving an indication of selected POI 312 from a user, user program 112 sends the information regarding the selected POI 312 (e.g., a name of selected POI 312 or location of selected POI 312) to viewpoint program 122. Viewpoint program 122 determines the groupings and locations of viewpoints 314a-i. Viewpoints 314a-i represent groupings of images including selected POI 312 within the captured image and where images in a grouping were taken from a similar location (e.g., a viewpoint of the POI). Furthermore, viewpoint program 122 determines a ranking of viewpoints 314a-i based on one or more of a frequency, visibility or feedback score for images of each respective viewpoint grouping. Viewpoint program 122 sends the locations and ranking scores for viewpoints 314a-i to user program 112.

In the example user interface 300, user program 112 displays viewpoint 314a-i on electronic map 310, where the locations of each viewpoint corresponds to the location of the viewpoint on electronic map 310. Additionally, user program 112 displays an indication of the ranking score. In this example, viewpoints 314a, 314c and 314i indicate viewpoints with lower ranked grouping of images of the POI. This may be attributed to fewer images taken from the locations associated with the viewpoints, the POI being obscured from view at those locations, more negative feedback associated with images taken from the viewpoints, or any combination thereof. Viewpoints 314e-f indicate viewpoint with higher ranked groupings of images compared to other viewpoints 314a-d and 314g-i. This may be attributed to more images taken from the locations associated with the viewpoints, a clearer view of the POI from those locations, more positive feedback associated with images taken from the viewpoints, or any combination thereof. Viewpoints 314b, 314d, and 314g-h indicate image groupings with a higher ranking than viewpoints 314a, 314c and 314i but a lower ranking than viewpoints 314e-f.

In various embodiments, user program 112 receives input from a user indicating a selection of a viewpoint from viewpoints 314a-i. In this example, a user has selected viewpoint 314d. In response, user program 112 displays viewpoint information 320. Viewpoint information includes viewpoint name 322, viewpoint ranking 324 and viewpoint images 326. Upon selection of a viewpoint by a user, user program 112 sends an indication of the selected viewpoint (e.g., viewpoint 314d) to viewpoint program 122. Viewpoint program 122 retrieves a name associated with the location of the selected viewpoint from map data 124, sending the name to user program 112. For example, if the viewpoint is near a location in map data 124, then viewpoint program 122 provides the name of the location. Viewpoint program 122 retrieves the ranking score associated with the viewpoint, sending the ranking score to user program 112. Viewpoint program 122 also retrieves images from image data 126. The retrieved images include images taken from the viewpoint that include the selected POI 312 in the captured image. In some embodiments, viewpoint program 122 provides images within the grouping for the selected viewpoint that have a higher individual ranking score among all images in the grouping. For example, viewpoint program 122 retrieves images with a high visibility score or feedback score.

Figure 4:
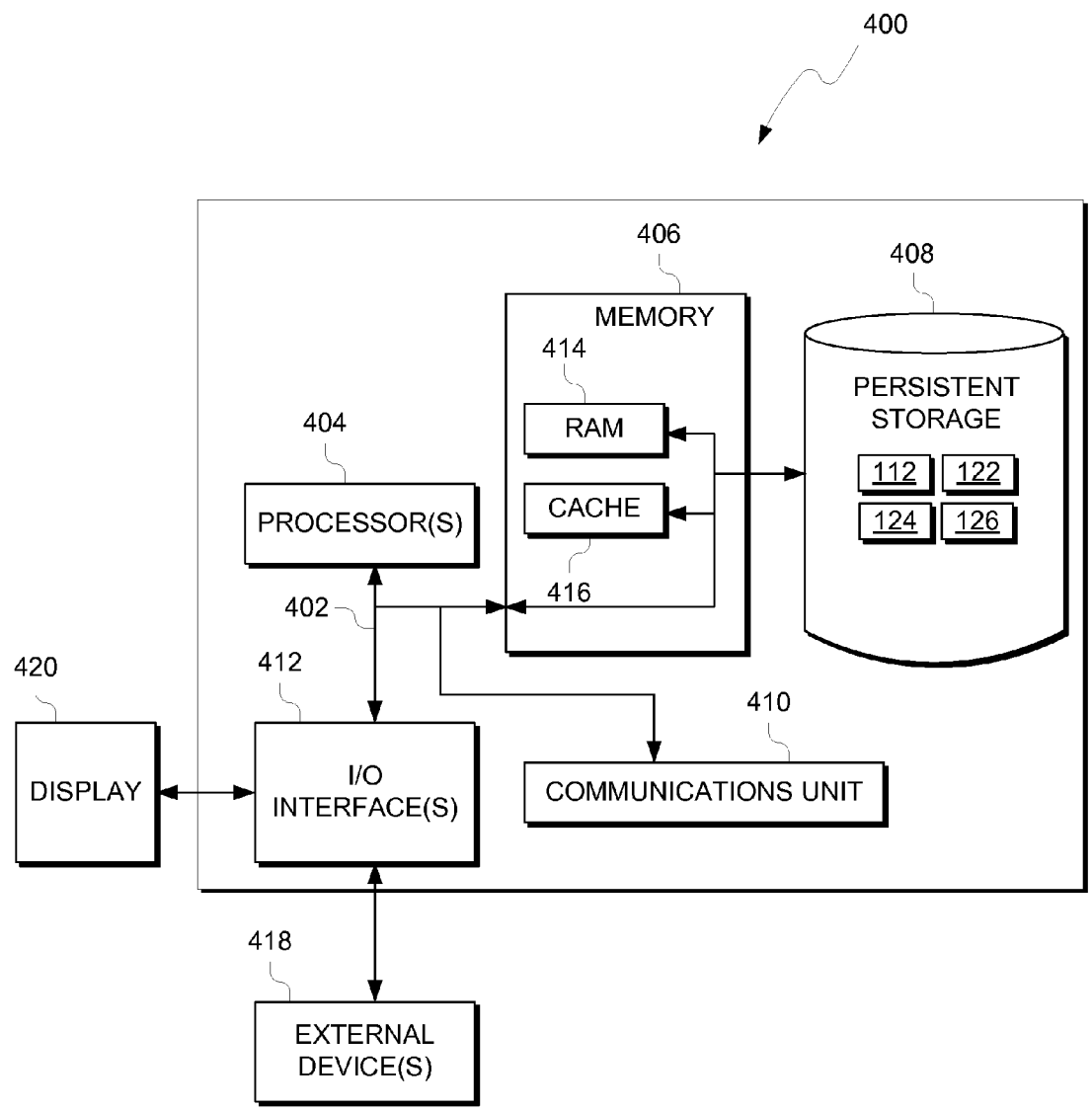
FIG. 4 depicts a block diagram of components of the computing device executing viewpoint program, in accordance with an exemplary embodiment of the present invention.

FIG. 4 depicts a block diagram, 400, of components of user device 110 and server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

User device 110 and server 120 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

User program 112, viewpoint program 122, map data 124 and image data 126 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 130. In these examples, communications unit 410 includes one or more network interface cards. Communications unit 410 may provide communications through the use of either or both physical and wireless communications links. User program 112, viewpoint program 122, map data 124 and image data 126 may be downloaded to persistent storage 408 through communications unit 410.

I/O interface(s) 412 allows for input and output of data with other devices that may be connected to each of user device 110 and server 120. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., user program 112, viewpoint program 122, map data 124 and image data 126, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
    determining, by one or more processors, a first viewpoint of the point of interest on an electronic map, wherein the first viewpoint includes a first image group captured from a first location;
    determining, by the one or more processors, a second viewpoint of the point of interest on an electronic map, wherein the second viewpoint includes a second image group captured from a second location;
    determining, by the one or more processors, a visibility score for the first image group based, at least in part, on an amount of the point of interest that is obscured from view in images captured from the first location;
    determining, by the one or more processors, a visibility score for the second image group based, at least in part, on an amount of the point of interest that is obscured from view in images captured from the second location;
    determining, by the one or more processors, a first ranking score for the first viewpoint based, at least in part, on the visibility score for the first image group;
    determining, by the one or more processors, a second ranking score for the second viewpoint based, at least in part, on the visibility score for the second image group; and
    generating, by the one or more processors, a ranked list of the first viewpoint and the second viewpoint based, at least in part, on the first ranking score and the second ranking score.

2. The method of claim 1, wherein the first viewpoint is based, at least in part, on location metadata extracted from images in the first image group.

3. The method of claim 1, the method further comprising:
    retrieving, by the one or more processors, an image from an online repository; and
    in response to content of the image matching content of a set of images from the first image group, assigning, by the one or more processors, a location of the image to the first viewpoint.

4. The method of claim 1, wherein the ranked list is based, at least in part, on a first feedback score of the first image group and a second feedback score of the second image group.

5. The method of claim 4, the method further comprising:
    in response to a determination that the first feedback score is larger than the second feedback score, assigning, by the one or more processors, the first viewpoint to a higher position in the ranked list than the second viewpoint, wherein the first feedback score indicates a greater amount of positive feedback by users who viewed images in the first image group.

6. The method of claim 1, the method further comprising:
    in response to a determination that the visibility score for the first image group is larger than the visibility score for the second image group, assigning, by the one or more processors, the first viewpoint to a higher position in the ranked list than the second viewpoint, wherein the visibility score for the second image group indicates a greater obscured view of the point of interest for images in the second image group.

7. A computer program product comprising:
    one or more computer-readable storage media and program instructions stored on the one or more computer-readable storage media, the program instructions comprising:
        program instructions to determine a first viewpoint of the point of interest on an electronic map, wherein the first viewpoint includes a first image group captured from a first location;
        program instructions to determine a second viewpoint of the point of interest on an electronic map, wherein the second viewpoint includes a second image group captured from a second location;
        program instructions to determine a visibility score for the first image group based, at least in part, on an amount of the point of interest that is obscured from view in images captured from the first location;
        program instructions to determine a visibility score for the second image group based, at least in part, on an amount of the point of interest that is obscured from view in images captured from the second location;
        program instructions to determine a first ranking score for the first viewpoint based, at least in part, on the visibility score for the first image group;
        program instructions to determine a second ranking score for the second viewpoint based, at least in part, on the visibility score for the second image group; and program instructions to generate a ranked list of the first viewpoint and the second viewpoint based, at least in part, on the first ranking score and the second ranking score.

8. The computer program product of claim 7, wherein the first viewpoint is based, at least in part, on location metadata extracted from images in the first image group.

9. The computer program product of claim 8, the program instructions further comprising:
  program instructions to retrieve an image from an online repository; and
  responsive to content of the image matching content of a set of images from the first image group, program instructions to assign a location of the image to the first viewpoint.

10. The computer program product of claim 7, wherein the ranked list is based, at least in part, on a first feedback score of the first image group and a second feedback score of the second image group.

11. The computer program product of claim 10, the program instructions further comprising:
  responsive to a determination that the first feedback score is larger than the second feedback score, program instructions to assign the first viewpoint to a higher position in the ranked list than the second viewpoint, wherein the first feedback score indicates a greater amount of positive feedback by users who viewed images in the first image group.

12. The computer program product of claim 7, the program instructions further comprising:
  in response to a determination that the visibility score for the first image group is larger than the visibility score for the second image group, program instruction to assign the first viewpoint to a higher position in the ranked list than the second viewpoint, wherein the visibility score for the second image group indicates a greater obscured view of the point of interest for images in the second image group.

13. A computer system comprising:
  one or more computer processors;
  one or more computer readable storage media; and
  program instructions stored on the computer readable storage media for execution by at least one of the one or more processors, the program instructions comprising:
    program instructions to determine a first viewpoint of the point of interest on an electronic map, wherein the first viewpoint includes a first image group captured from a first location;
    program instructions to determine a second viewpoint of the point of interest on an electronic map, wherein the second viewpoint includes a second image group captured from a second location;
    program instructions to determine a visibility score for the first image group based, at least in part, on an amount of the point of interest that is obscured from view in images captured from the first location;
    program instructions to determine a visibility score for the second image group based, at least in part, on an amount of the point of interest that is obscured from view in images captured from the second location;
    program instructions to determine a first ranking score for the first viewpoint based, at least in part, on the visibility score for the first image group;
    program instructions to determine a second ranking score for the second viewpoint based, at least in part, on the visibility score for the second image group; and
    program instructions to generate a ranked list of the first viewpoint and the second viewpoint based, at least in part, on the first ranking score and the second ranking score.

14. The computer system of claim 13, wherein the first viewpoint is based, at least in part, on location metadata extracted from images in the first image group.

15. The computer system of claim 14, the program instructions further comprising:
  program instructions to retrieve an image from an online repository; and
  responsive to content of the image matching content of a set of images from the first image group, program instructions to assign a location of the image to the first viewpoint.

16. The computer system of claim 13, wherein the ranked list is based, at least in part, on a first feedback score of the first image group and a second feedback score of the second image group.

17. The computer system of claim 16, the program instructions further comprising:
  responsive to a determination that the first feedback score is larger than the second feedback score, program instructions to assign the first viewpoint to a higher position in the ranked list than the second viewpoint, wherein the first feedback score indicates a greater amount of positive feedback by users who viewed images in the first image group.

18. The computer system of claim 13, the program instructions further comprising:
  in response to a determination that the visibility score for the first image group is larger than the visibility score for the second image group, program instruction to assign the first viewpoint to a higher position in the ranked list than the second viewpoint, wherein the visibility score for the second image group indicates a greater obscured view of the point of interest for images in the second image group.

* * * * *